May 7, 1963  E. J. SMOLTZ  3,088,213
AUTOMATIC INDICATING TOOL
Filed May 31, 1961

INVENTOR.
ERWIN J. SMOLTZ
BY
ATTORNEYS 3,088,213
AUTOMATIC INDICATING TOOL
Erwin J. Smoltz, 13521 Chestnut St., Westminster, Calif.
Filed May 31, 1961, Ser. No. 113,967
2 Claims. (Cl. 33—180)
(Granted under Title 35, U.S. Code (1952), sec. 266)

The invention described herein may be manufactured and used by or for the Government of the United States of America for governmental purposes without the payment of any royalties thereon or therefor.

This invention relates to centering tools and, more specifically, it relates to a tool for rapidly centering ring stock on a machine table for turning.

In the past it has been the practice in machine shops to place a piece of ring stock to be turned at the approximate center of the table, concentric with the table spindle. After lightly clamping the stock in position the table is rotated and the concentric position of the ring stock is tested by use of soapstone or, more accurately, by a dial indicator. Such a trial and error process is time consuming since after each reading the ring must be tapped at the high spot to adjust its position toward concentricity. This is true even with a skilled operator but with an inexperienced machinist the cost of time is overshadowed by the amount of stock ruined. Especially when Babbitt or soft ring bearings are to be turned the indicator may mark or permanently score the surface.

The general object of the proposed invention is to eliminate the foregoing and related disadvantages and provide an improved method and apparatus for accomplishing that purpose.

Objects of the invention include the provision of a tool housing which automatically centers itself on a rotating machine table and is adapted to be encircled by a piece of ring stock lying on said table.

Additional objects include providing structural means for guiding and automatically forcing a plurality of radially sliding pins outward in progressively enlarging concentric circles.

Other objects include means for locking the combination in its extreme position in contact with the ring stock to be centered, and means for automatically releasing the centering force when the locking means is released.

Still other objects are to provide an inexpensive, automatic, foolproof method for centering ring stock.

Various other objects and advantages will appear from the following description of one embodiment of the invention, and the most novel features will be particularly pointed out hereinafter in connection with the appended claims.

Figure 1:
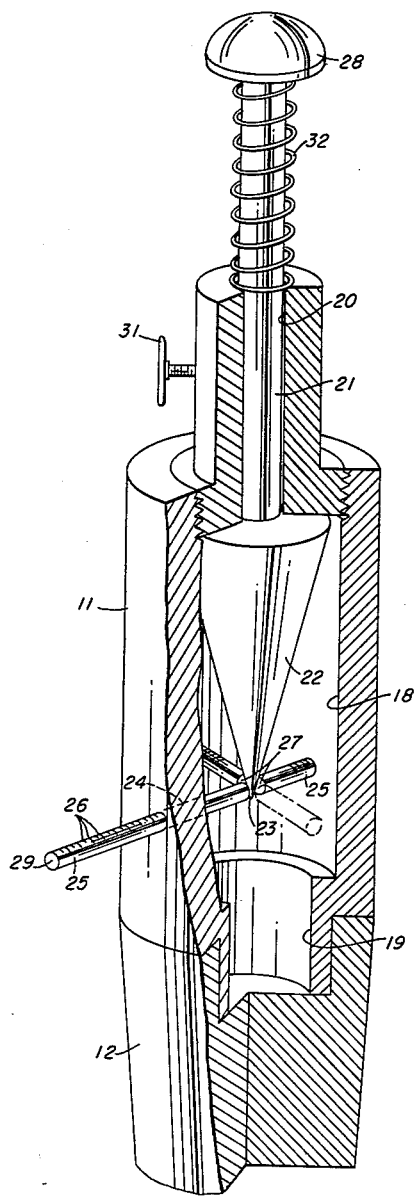
FIG. 1 is a perspective view showing the centering tool partially in section.
Figure 2:
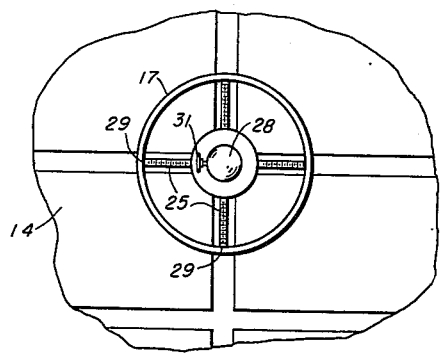
FIG. 2 is a plan view showing a piece of ring stock centered by the tool on a machine table.
Figure 3:
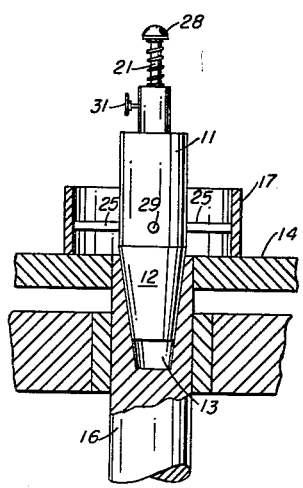
FIG. 3 is a front elevation partially in section illustrating the centering tool mounted in the turntable spindle socket and showing the centering pins in relation to a piece of ring stock.

Basically, the structure includes a tool body 11 mounted on a tapered base 12 which fits the tapered socket 13 of spindle 16 of the turntable 14. By inserting the tapered base 12 into the matching tapered socket 13 the tool body 11 is assured of being at the center of the rotating turntable 14. The next step in the operation is to place the sample of ring stock 17 to be turned on the turntable 14 encircling the centering tool body 11.

The tool body 11 is provided with an axial bore consisting of three sections. The main axial bore section 18, the clearance section 19 and the plunger rod section 20.

An operating plunger 21 is slidably mounted in bore section 20 and is operably attached to a tapered head 22. The tapered head 22 shown in FIG. 1 is conical in shape whose apex 23 is at the lower end of the plunger assembly.

The body portion surrounding the main axial bore section 18 is provided with a plurality of radial guides 26. In the particular embodiment FIG. 1 four radial guides 26 are employed and four equal length centering pins 25 are slidably mounted respectively in said guides 24. The centering pins 25 are provided with scale markings 26 indicating diameter of the ring to be centered equal to the distance between the outboard ends of said pins 25. It is evident that the length of said centering pins 25 may be chosen according to the inside diameter of ring 17 to be turned, the greater the diameter the longer the pins.

The basic operation includes the step of manually moving the centering pins 25 radially outward until the diameter scale markings 26 on the pins are equal to the internal diameter of the ring stock 17. This will center the ring 17 about the axis of the turntable spindle 16. To make the aforesaid operation foolproof and automatic the tapered head 22 has been employed to equalize the radial movement of all the pins simultaneously.

In automatic operation the apex 23 of tapered head 22 would normally coincide with the inboard ends 27 of the centering pins 25. By thrusting downward on handle 28 the tapered head 22 would be wedged between the inboard ends 27 of pins 25, thus forcing the outboard ends 29 radially outward until they are stopped by the inside surface of ring stock 17. The clearance bore 19 is provided to allow clearance for the apex 23 of tapered head 22. During this operation the progressive outward movement of the centering pins 25 will automatically adjust the position of ring 17 until it is concentrically positioned around the tool body axis. The length of centering pins employed will depend upon the inside diameter of ring stock employed. It is also apparent that such a ring might be eccentrically located in reference to the tool body axis by mathematically calculating the necessary pin lengths for the desired eccentricity.

When the ring has been properly centered as described above, the head 22 is temporarily held in position by thumb screw 31 and the ring is then clamped to the turntable 14. After the clamping operation is complete the thumb screw 31 is released and the tapered head is automatically returned to its original starting position by means of spring 32. The tool 11 is then removed and the turning operation for machining the ring is started.

Obviously many modifications and variations of the present invention are possible in the light of the above teachings. It is therefore to be understood that within the scope of the appended claims the invention may be practiced otherwise than as specifically described.

What is claimed is:

1. A method for rapidly centering cylindrical ring stock on a horizontal rotating machine table mounted on a spindle provided with an axial tapered socket including the steps of mounting a tool body equipped with an axial tapered base to fit said socket in said spindle, encircling said tool body with a piece of ring stock to be machined, initially depressing an axial plunger connected to a conical tapered head in said tool body for manually moving a plurality of radially sliding centering pins mounted in said body outward until at least one of said pins contacts the inside diameter of said ring stock, then forcing the plunger further so that said at least one pin in contact with the ring will directly shift the position of the ring stock until all the pins contact the inside diameter of said ring stock simultaneously so that the ring stock is centered for machining and the plunger is in its extreme position, then locking the center plunger in its extreme position so that the ring stock can be secured to the rotating machine table for turning.

2. A centering tool for mounting cylindrical ring stock on a horizontal machine table rotatively supported on a vertical spindle provided with a tapered socket, comprising a tool body having an axial cylindrical bore and a tapered base mounted in said spindle socket, a piece of ring stock on said machine table eccentric to said tool body, a plurality of sliding centering pins of equal length radially mounted in a horizontal plane in said body and having their inboard ends terminating adjacent the axis of said body, a plunger slidably mounted in said axial bore and provided with a conical head; said conical head having an apex aligned for initially contacting all the inboard ends of said centering pins simultaneously; means connected to said conical head for initially moving said conical head axially so that the outboard ends of said pins are moved radially outward until at least one of said pins contacts the inside diameter of said eccentric ring stock; said means being of such a length that additional force on said plunger will cause said conical head to move axially thereby causing said ring stock to be shifted by said at least one pin contact therewith until all of the pins are in contact therewith so that the ring will be concentric with said tool.

References Cited in the file of this patent

UNITED STATES PATENTS

| | | |
|---|---|---|
| 714,448 | Bryan | Nov. 25, 1902 |
| 857,810 | Kohlhaas | June 25, 1907 |
| 1,013,911 | Weber | Jan. 9, 1912 |
| 1,404,989 | Marcy | Jan. 31, 1922 |
| 1,416,694 | De Leeuw | May 24, 1922 |
| 1,448,528 | Elliott | Mar. 13, 1923 |
| 2,134,372 | Olson | Oct. 25, 1938 |

OTHER REFERENCES

| | | |
|---|---|---|
| 6,816 | Great Britain | Feb. 8, 1896 |